Patented Nov. 28, 1922.

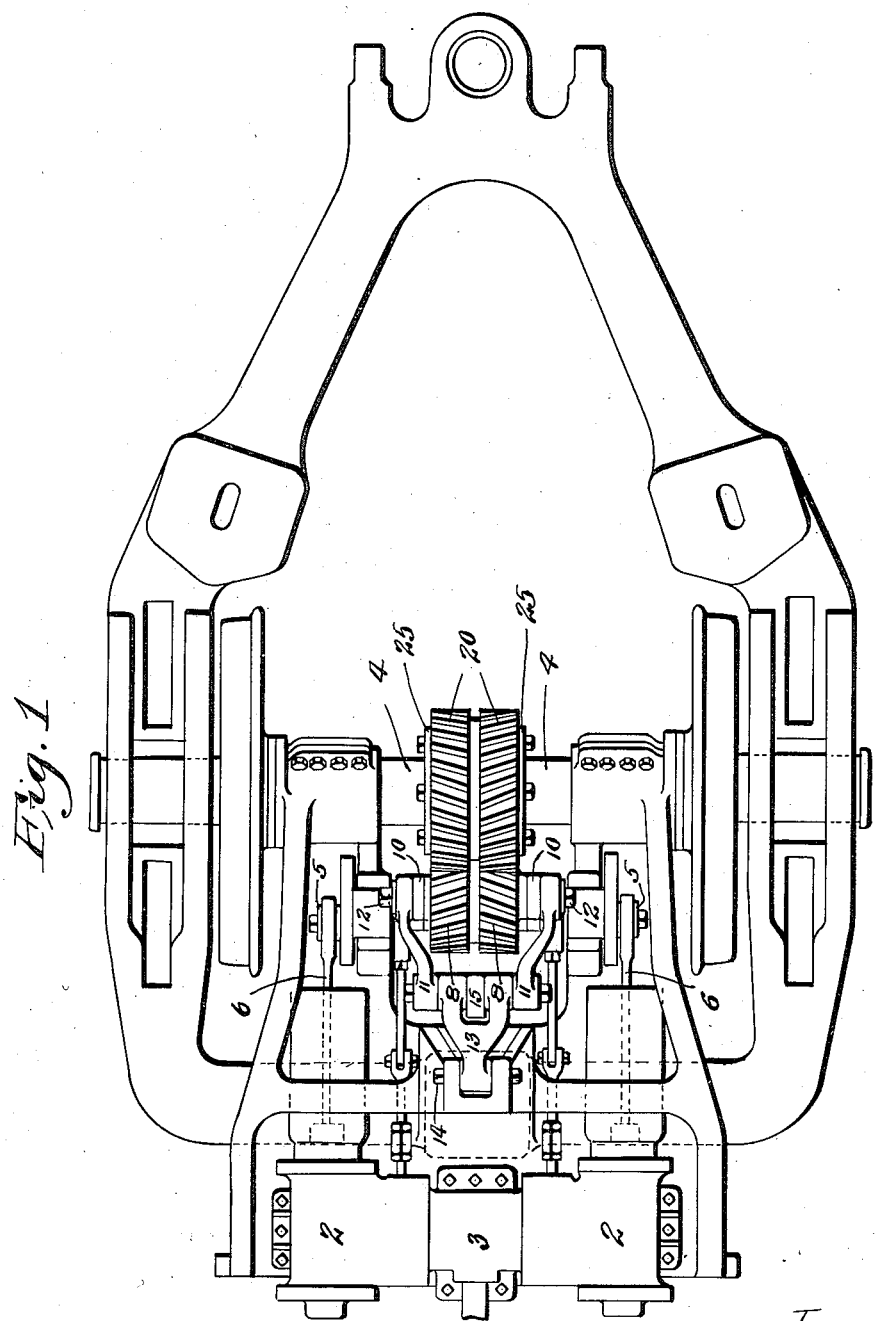

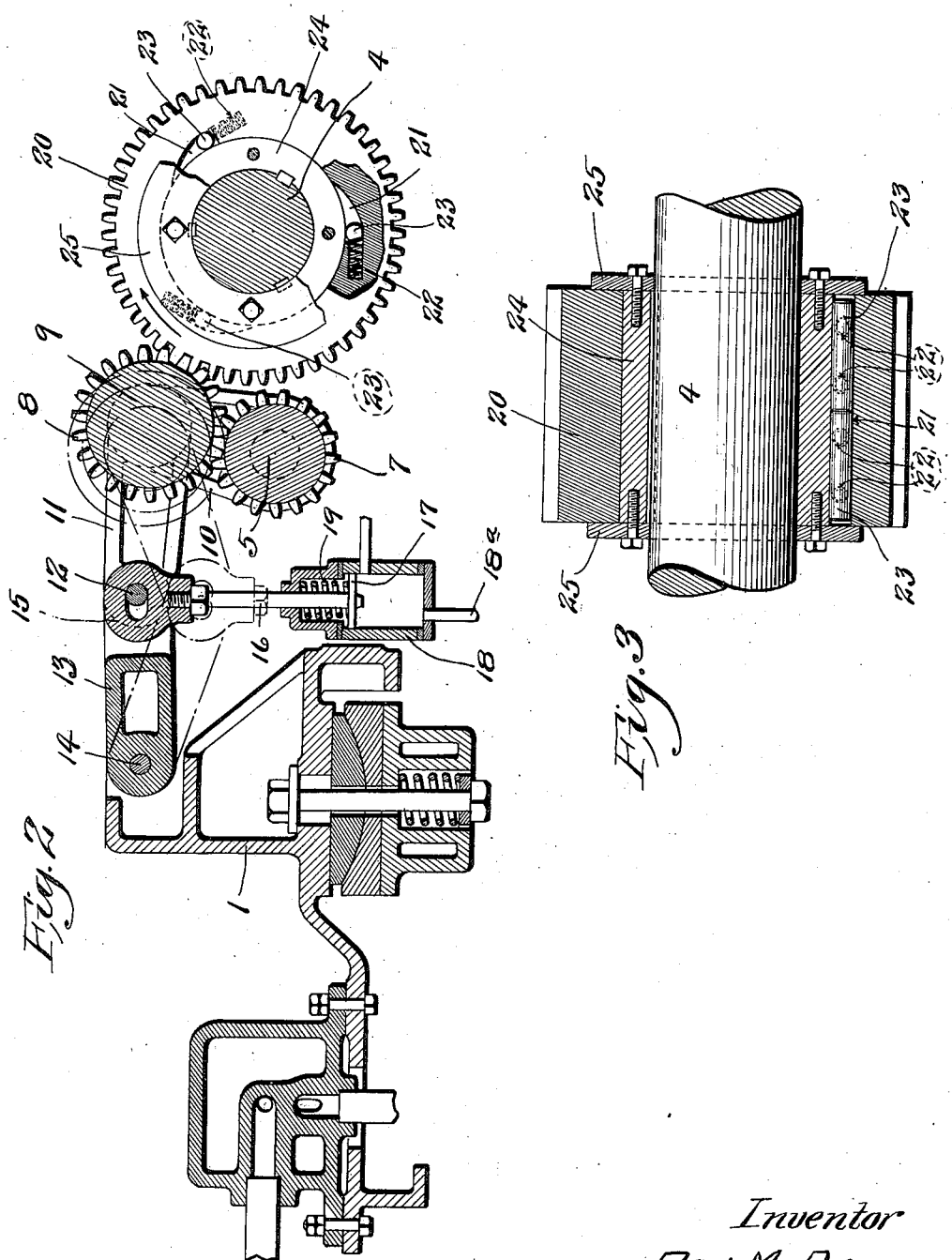

1,437,129

UNITED STATES PATENT OFFICE.

RAY M. BROWN, OF YONKERS, NEW YORK, ASSIGNOR TO HOWARD L. INGERSOLL, OF WHITE PLAINS, NEW YORK.

SAFETY CLUTCH FOR BOOSTER MOTORS.

Application filed July 12, 1919. Serial No. 310,508.

*To all whom it may concern:*

Be it known that I, RAY M. BROWN, a citizen of the United States, residing at Yonkers, Westchester County, New York, have invented a certain new and useful Improvement in Safety Clutches for Booster Motors, of which the following is a full, clear, and exact description, such as will enable others skilled in the art to which it appertains to make and use the same, reference being had to the accompanying drawings, forming part of this specification, in which—

Figure 1 is a top plan view of a booster motor for locomotives showing my improved safety clutch in position thereon.

Figure 2 is a vertical longitudinal section through the same showing the clutch mechanism, and Figure 3 is a sectional view through the driven clutch gears.

This invention relates to a new and useful improvement in clutch mechanism for booster motors for locomotives of the character shown in the application filed by Howard L. Ingersoll May 22, 1919, Serial No. 299,037 (patented May 11, 1920 as No. 1,339,395).

The details of the booster motor itself, the manner of controlling the same and of mounting its bed-plate on the trailer truck of the locomotive form no part of this present invention, and, therefore, need not be described.

The object of the present invention is to take care of the difference in speed between the main locomotive and the booster motor and to introduce an element of safety tending to prevent stripping of the gears in the event that the booster motor is thrown into gear when the main locomotive is running at a high speed. Where the speed of the main locomotive is greater than that of the booster motor, the trailer axle and its carried gear will revolve faster than the gear driven by the booster motor, and by interposing friction rollers between the gear and the axle, the axle will be free to move faster than the booster motor can drive the gear. If it were not for this clutch arrangement, when the locomotive was running faster than the booster motor, part of its power would be utilized in driving the booster engine; but with this clutch intervening, the booster will be automatically cut out and the burden or drag removed from the main locomotive. Furthermore, in the event that the booster motor is thrown into gear when the main locomotive is running at a high speed, the clutch will prevent stripping of the gear teeth.

Another feature of this invention is in the toggle mechanism for throwing the gears into and out of mesh.

In the accompanying drawings, 1 indicates the frame or bed-plate on which the cylinders 2, steam chest 3, valve mechanism and other parts of the booster motor are mounted, said frame having bearings at its forward end by which it is mounted on the axle 4 of the trailer truck.

5 indicates a crank shaft which is driven by the pitmen 6 connected to the cross-heads operated by the pistons in the cylinders of the booster motor. This crank shaft 5 has a pinion 7 mounted thereon, or rather set of pinions, as the pinion 7 consists of a twin skew gear, meshing with a twin skew gear or intermediate pinion 8, which latter is mounted on a shaft 9 having bearings in the upper ends of rock arms 10 which are pivotally supported by the crank shaft 5. The rearwardly extending arms 11, whose forward ends are pivotally mounted on shaft 9, are pivotally connected by means of a pintle bolt 12 to another member 13 of a toggle mechanism, thus formed, the member 13 of the toggle being pivoted on a bolt 14 mounted in the bearings in the bed-plate 1. 15 is an eye having an elongated slot through which passes the pintle or bolt 12 and to which eye is connected a piston rod 16 of a piston 17 mounted in a cylinder 18. A spring 19 arranged above the piston 17 tends at all times to depress the piston, and, by breaking the toggle, move the gear 8 out of mesh with the clutch gear 20 carried by the axle 4.

In the control of the booster motor, as described in said Ingersoll application, compressed air is admitted under the piston 17 through a pipe 18$^a$ whereby the piston is raised and the toggle straightened, as shown by the full line position of the parts in Figure 2. By straightening the toggle, the gear 8 is thrown into mesh with the gear 20, and the booster motor thus placed in driving relation to the axle 4. When the air is exhausted from the cylinder 18, spring 19 will break the toggle causing the parts to assume the dotted-line position in which gear 8 is out of mesh with gear 20 but remains in mesh with gear 7.

Gear 20 may be one member of a clutch, and for this purpose its inner periphery is provided with notches or recesses 21 having inclined faces or walls at one side and recesses at the opposite side for housing springs 22 which bear upon the friction clutch rollers 23, as shown in Figures 2 and 3. These friction rollers are preferably made up in sections, there being two springs arranged behind each roller section.

24 indicates the driven member of the clutch in the form of a sleeve keyed on the axle 4 and arranged within the gear 20. This sleeve 24 has plates 25 secured to it at each end, which not only serve to house in the friction clutch rollers but to retain the gear 20 in position.

In operation, when the gears 8 and 20 are entrained, as hereinabove described by straightening out the toggle, and, when steam is admitted to the booster motor, the gear 20, being rotated in the direction of the arrow (Figure 2) will cause the rollers in the inclined grooves in the inner face of the gear ring, to grip the sleeve 24 keyed to the axle and form a rigid connection between the gear and the axle, thus transmitting power from the booster motor to the axle. In case the speed of the main locomotive becomes greater than that of the booster, the trailer axle will revolve faster than the gear and the friction clutch rollers will be forced outwardly in their grooves, releasing the gear ring and enabling the truck axle to travel free and so relieve the main locomotive of the burden of dragging the booster motor.

In the Ingersoll system of booster motor control, means are provided for cutting out the motor, i. e., shutting off the supply of steam thereto, and also disentraining the gears 8 and 20 when the locomotive attains a certain speed.

These features are incidentally mentioned here because, in ordinary practice, the booster motor is not designed to operate at a speed higher than twelve miles an hour, at which speed it is designed to be automatically cut out. My friction clutch arrangement provides a safety device so that in the event of failure of the cut out devices or in the event that the booster motor remains entrained with its axle when the main locomotive is running at a higher speed than the booster motor is designed to run, then the gear 20 may lag and permit the more rapid rotation of the axle by which it is carried without endangering any of the moving parts of the booster motor and without imposing a burden on the main locomotive.

Another advantage of the friction clutch arrangement resides in the fact that if by accident the booster motor should be cut in, i. e., entrained with its axle when the main locomotive is running at a high speed, there will be no danger of stripping the teeth of the gears as the clutch will permit the gear 20 to remain stationary while the axle 4 is rotating in a forward direction.

What I claim is:

1. In a booster motor for locomotives, the combination of a driving shaft, a gear thereon, rock arms mounted on said driving shaft, a rocking gear carried by said rock arms and in constant mesh with said first mentioned gear, a driven axle, a gear arranged on said driven axle, and a toggle mechanism for moving said rocking gear into and out of mesh with the gear on the driven axle.

2. In a booster motor for locomotives, the combination of a driven axle, a gear mounted thereon, a booster motor bed plate hung from said axle, a driving shaft mounted on said bed-plate, a gear on said driving shaft, a rocking gear constantly in mesh with said last mentioned gear and designed to be moved into and out of mesh with the gear on the driven shaft, a toggle mechanism for effecting such movement, and a pressure operated piston for moving said toggle.

3. In a booster motor for locomotives, the combination of a driven axle, a gear mounted thereon, a booster motor bed-plate swung from said axle, a drive shaft mounted on said bed-plate, a gear on said drive shaft, rock arms mounted on said drive shaft, a gear carried by said rock arms and in constant mesh with the gear on said drive shaft, a toggle mechanism including said rock arms and whose other member is mounted on said bed-plate for moving said rocking gear into and out of mesh with the gear on the driven shaft, and a fluid-operated piston mounted on said bed-plate for moving said toggle mechanism.

4. The combination with the main driving means of a locomotive of a driven axle, a gear element mounted thereon, a booster motor for driving said gear element, and means interposed between said booster motor and said driven axle whereby when the speed of the axle exceeds that of the motor there will be a slippage or lag in the driving mechanism.

5. The combination with the main driving means of a locomotive of a driven axle, a gear element mounted thereon, a booster motor designed to engage and be disengaged from said gear element, and a clutch mechanism interposed between the gear element and the driven axle, whereby if said booster motor is thrown into mesh with said gear element when the latter is rotating at a high rate of speed the clutch will operate to prevent the stripping of the teeth of the entrained gear.

6. In combination with a locomotive and a booster motor for aiding the main driving means of the locomotive in starting and in propelling the same at low speeds, a gear on one of the wheel axles of the locomotive, a gear adapted to be entrained with and disentrained from the first named gear, and means providing a driving engagement between said first named gear and said axle which permits the axle to run free of the gear when revolved at a higher velocity than the gear is driven.

7. In combination with a locomotive and a booster motor for aiding the main driving means of the locomotive in starting and in propelling the same at low speeds, a driving connection between the booster motor and one of the wheel axles of the locomotive comprising a gear on said axle, and means for engaging the gear with the axle which permits the axle to run free from the gear when revolved at a higher velocity than the gear is driven.

8. In combination with a locomotive and a booster motor for aiding the main driving means of the locomotive in starting and in propelling the same at low speeds, and a driving connection between the booster motor and one of the wheel axles of the locomotive, effective at low speeds of the locomotive, from which the axle is disengaged at speeds in excess of the driving speed of the booster motor.

9. In combination with the main driving means of a locomotive having a normally idle axle, a booster motor, and mechanism actuated by compressed air for establishing a releasable driving connection between said booster motor and said normally idle axle.

10. In combination with the main driving means of a locomotive, a booster motor for aiding the main driving means in starting the locomotive and propelling the same at relatively low speed, and a compressed air actuated mechanism for establishing a releasable driving connection between said booster motor and the locomotive.

11. In combination with the main driving means of a locomotive having a normally idle axle, a booster motor, a gear on said axle, a gear adapted to be driven by the booster motor, and means for moving said last named gear into and out of mesh with the gear on the axle.

12. In combination with the main driving means of a locomotive having a normally idle axle, a booster motor, a gear on said axle, a gear adapted to be driven by the booster motor, and compressed air actuated mechanism for moving said last named gear into and out of mesh with the gear on the axle.

13. In combination with the main driving means of a locomotive having a normally idle axle, a booster motor, a gear on said axle, a gear revoluble on a fixed axis which is driven by the booster motor and is out of contact with the first-named gear, and an intermediate gear normally in mesh with only one of the aforesaid gears, and means for moving said intermediate gear so that it will also be in mesh with the other of the aforesaid gears.

14. In combination with the main driving means of a locomotive having a normally idle axle, a booster motor, a gear on said axle, a gear revoluble on a fixed axis which is driven by the booster motor and is out of contact with the first-named gear, an intermediate gear normally in mesh with only one of said first named gears, a movable support for said intermediate gear, and a fluid pressure actuated mechanism for moving said support to bring the intermediate gear into mesh also with the other of the aforesaid two gears.

15. In combination with the main driving means of a locomotive having a normally idle axle, a booster motor, a gear on said axle, a gear revoluble on a fixed axis which is driven by the booster motor and is out of contact with the first named gear, an intermediate gear normally in mesh with the gear driven by the booster motor and out of mesh with the gear on the axle, a movable support for said intermediate gear, and a compressed air actuated mechanism for moving said support so as to bring said intermediate gear into mesh also with the gear on the axle.

In testimony whereof I hereunto affix my signature this seventh day of July, 1919.

RAY M. BROWN.